US012670569B2

(12) United States Patent (10) Patent No.: US 12,670,569 B2
Enomoto (45) Date of Patent: Jun. 30, 2026

(54) SUBSTRATE ANALYSIS SYSTEM, SUBSTRATE ANALYSIS METHOD, AND RECORDING MEDIUM

(71) Applicant: Tokyo Electron Limited, Tokyo (JP)

(72) Inventor: Masashi Enomoto, Koshi City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 324 days.

(21) Appl. No.: 18/149,207

(22) Filed: Jan. 3, 2023

(65) Prior Publication Data

US 2023/0214984 A1      Jul. 6, 2023

(30) Foreign Application Priority Data

Jan. 5, 2022    (JP) ................................. 2022-000459

(51) Int. Cl.
G06T 7/00 (2017.01)
(52) U.S. Cl.
CPC .. G06T 7/0004 (2013.01); G06T 2207/10048 (2013.01); G06T 2207/30148 (2013.01)
(58) Field of Classification Search
CPC ......... G06T 7/0004; G06T 2207/10048; G06T 2207/30148; G06T 3/40; H01L 22/12; H01L 21/0274; H01L 22/20; G03F 7/7065; G01N 21/9501; G01N 21/8851
USPC ................................................. 382/100, 149
See application file for complete search history.

(56) References Cited

U.S. PATENT DOCUMENTS

| | | | | |
|---|---|---|---|---|
| 11,354,804 | B1* | 6/2022 | Behrooz | G06T 5/73 |
| 2007/0071308 | A1* | 3/2007 | Nakatani | G03F 7/7065 |
| | | | | 382/149 |
| 2016/0025648 | A1* | 1/2016 | Duffy | H01J 37/26 |
| | | | | 250/306 |
| 2022/0283496 | A1* | 9/2022 | Lai | G03F 1/70 |

FOREIGN PATENT DOCUMENTS

| | | |
|---|---|---|
| JP | 2006-284522 A | 10/2006 |
| JP | 2017-003358 A | 1/2017 |
| JP | 2020-016497 A | 1/2020 |
| JP | 2021-097218 A | 6/2021 |
| WO | 2013/002179 A1 | 1/2013 |

* cited by examiner

*Primary Examiner* — Sheela C Chawan
(74) *Attorney, Agent, or Firm* — Chrisman Gallo Tochtrop LLC

(57) ABSTRACT

An analyzing device 10 includes an imaging unit 11 configured to image a substrate surface; a defect range estimation unit 131 configured to estimate a defect range, which is a range in which a defect exists on the substrate surface, based on an imaging result of the imaging unit 11; a gray value acquisition unit 132 configured to acquire multiple gray values in the defect range when light is radiated to the substrate surface; and a defect type determination unit 133 configured to determine a defect type in the defect range based on the gray value.

11 Claims, 10 Drawing Sheets

*FIG. 3*

DEFECT CLASSIFICATION A

DEFECT CLASSIFICATION B

Figure 10:
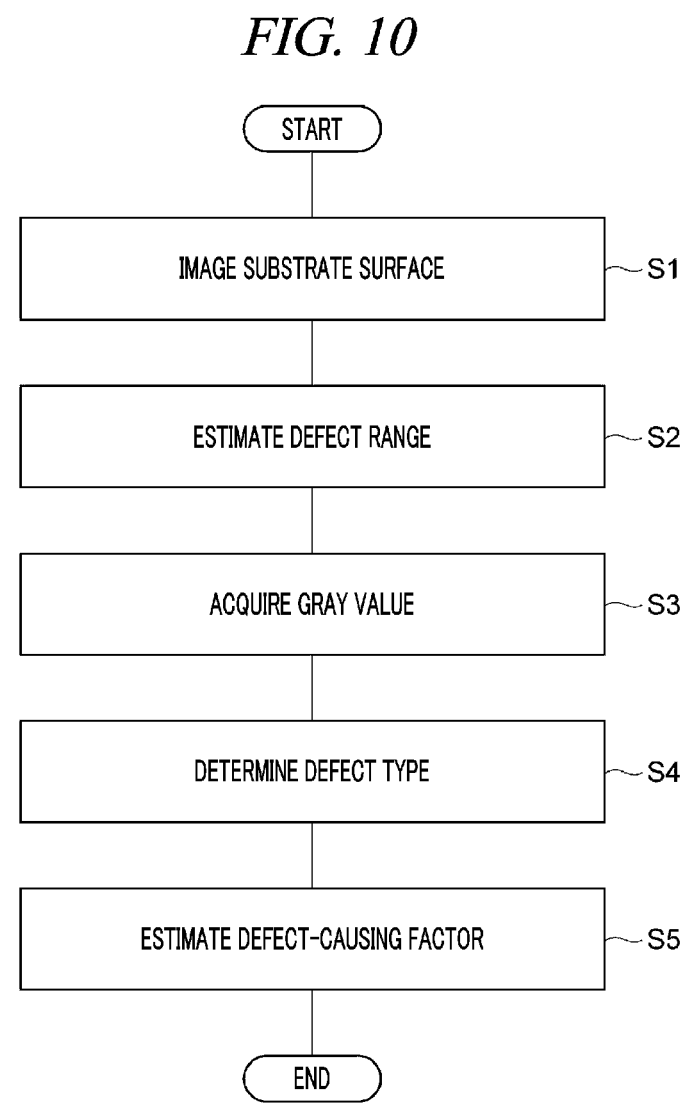

START

IMAGE SUBSTRATE SURFACE ~S1

ESTIMATE DEFECT RANGE ~S2

ACQUIRE GRAY VALUE ~S3

DETERMINE DEFECT TYPE ~S4

ESTIMATE DEFECT-CAUSING FACTOR ~S5

END

SUBSTRATE ANALYSIS SYSTEM, SUBSTRATE ANALYSIS METHOD, AND RECORDING MEDIUM

CROSS-REFERENCE TO RELATED APPLICATION

This application claims the benefit of Japanese Patent Application No. 2022-000459 filed on Jan. 5, 2022, the entire disclosure of which is incorporated herein by reference.

TECHNICAL FIELD

The various aspects and embodiments described herein pertain generally to a substrate analysis system, a substrate analysis method, and a recording medium.

BACKGROUND

Patent Document 1 describes a substrate processing method including a process of generating a captured image of a substrate after being subjected to a processing for each of a plurality of layers constituting a stacked film on the substrate, and a process of displaying information indicating a feature value estimated based on the captured image for each of the plurality of layers including the outermost layer of the stacked film.

Patent Document 1: Japanese Patent Laid-open Publication No. 2021-097218

SUMMARY

In one exemplary embodiment, a substrate analysis system includes an imaging unit configured to image a substrate surface; a defect range estimation unit configured to estimate a defect range, which is a range in which a defect exists on the substrate surface, based on an imaging result of the imaging unit; a gray value acquisition unit configured to acquire multiple gray values in the defect range when light is radiated to the substrate surface; and a defect type determination unit configured to determine a defect type in the defect range based on the gray value.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3 is a transversal cross sectional view schematically illustrating a configuration of an imaging unit;

FIG. 9 is a schematic diagram illustrating a hardware configuration of an analysis unit; and FIG. 10 is a flowchart showing a processing sequence of a substrate analysis method.

DETAILED DESCRIPTION

Figure 1:
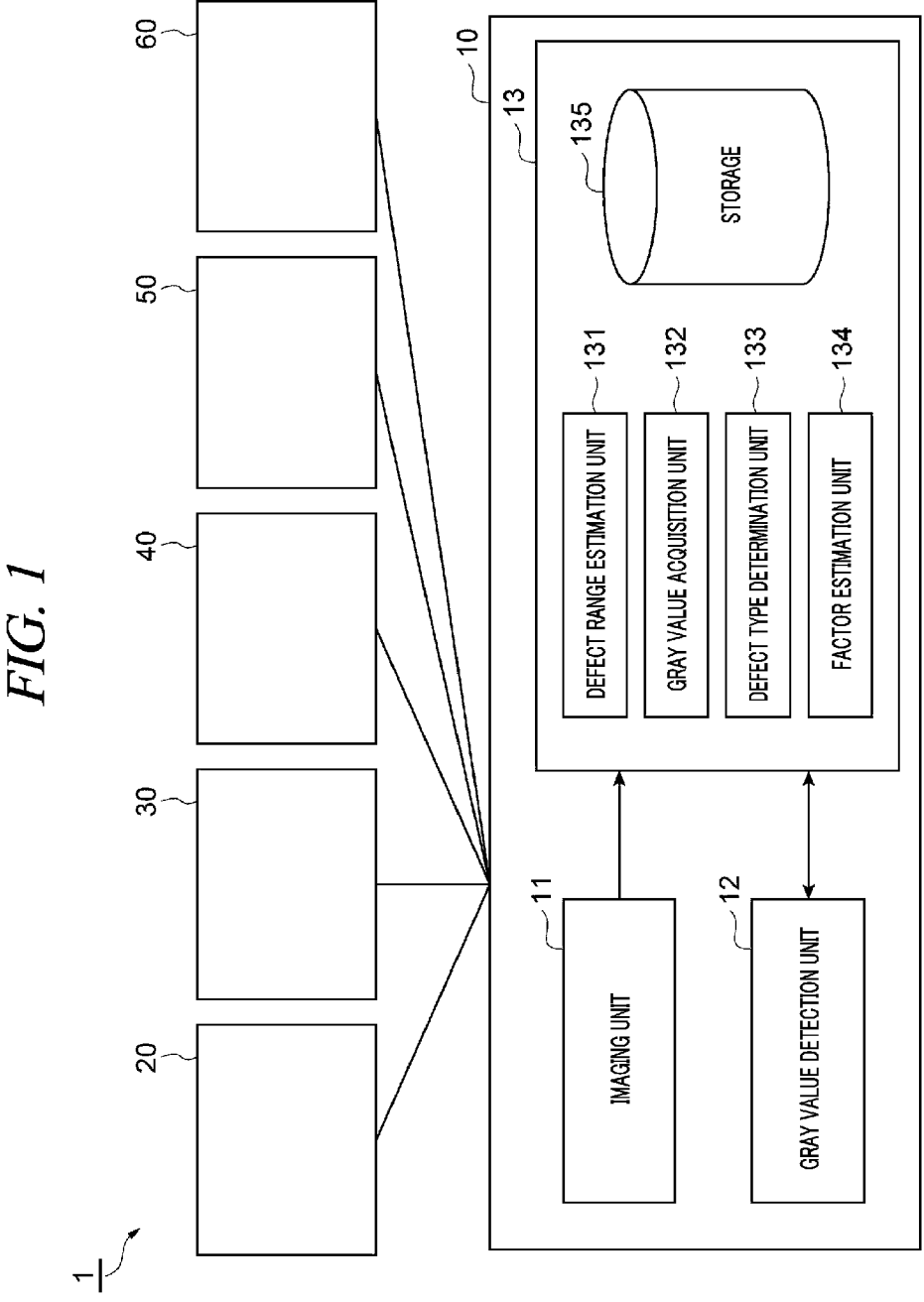
FIG. 1 is a schematic diagram illustrating an example of a schematic configuration of a substrate processing system.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, exemplary embodiments will be described with reference to the accompanying drawings. In the following description, same parts or parts having same functions will be assigned same reference numerals, and redundant description thereof will be omitted.

A substrate processing system 1 is a system configured to perform formation of a photosensitive film, exposure of the photosensitive film, and development of the photosensitive film on a substrate. Further, the substrate processing system 1 is also configured to perform etching of an oxide film/thin film along a pattern of the formed photosensitive film and perform a cleaning processing after the etching. The substrate as a processing target may be, by way of non-limiting example, a semiconductor wafer, a glass substrate, a mask substrate, a flat panel display (FPD), or the like. The substrate may include one having a film or the like formed on a semiconductor wafer or the like in a previous processing.

FIG. 1 is a schematic diagram illustrating an example configuration of the substrate processing system 1. In the example shown in FIG. 1, the substrate processing system 1 includes an analyzing device 10 (substrate analysis system), a coating apparatus 20, a developing apparatus 30, an exposure apparatus 40, an etching apparatus 50, and a cleaning apparatus 60. Here, two or more of these apparatuses may be configured as a single apparatus. For example, the coating apparatus 20 and the developing apparatus 30 may be configured as a single coating/developing apparatus.

The coating apparatus 20 is configured to form a resist film, which is a photosensitive film, on a surface of the substrate. The exposure apparatus 40 is configured to perform an exposure processing of radiating an energy ray to an exposure target portion of the resist film by such a method as immersion exposure. The developing apparatus 30 is configured to perform a developing processing on the resist film after the exposure processing. The etching apparatus 50 is configured to perform an etching processing of etching the oxide film/thin film along the pattern of the formed resist film.

The cleaning apparatus 60 is configured to perform a cleaning processing on the substrate after the etching processing. The cleaning apparatus 60 may include, for example, a device configured to dry the substrate by supplying IPA to the substrate after cleaning the substrate by supplying SC1 to the substrate being rotated. Further, the cleaning apparatus 60 may include, for example, a device configured to dry each of a group of substrates by supplying IPA to the group of substrates after performing a batch processing of supplying phosphoric acid to the group of substrates.

The analyzing device 10 is a device configured to analyze a processing state of the substrate by a substrate processing in each of the apparatuses belonging to the substrate processing system 1. The analyzing device 10 estimates a defect range in the substrate, and determines a type of the defect in the defect range from a gray value in the defect range. Further, the analyzing device 10 may also estimate a defect-causing factor in a previous process based on the determined defect type.

Figure 2A:
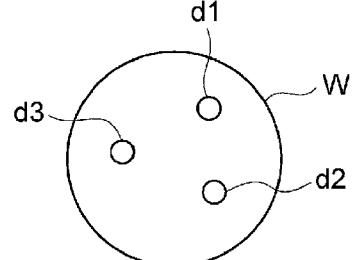
FIG. 2A and FIG. 2B are diagrams for describing defect range estimation and defect type determination.
Figure 2B:
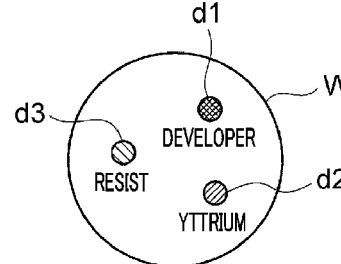

FIG. 2A and FIG. 2B are diagrams for describing defect range estimation and defect type determination. FIG. 2A is a diagram for describing an example of the defect range estimation, and FIG. 2B is a diagram for describing an example of the defect type determination for the defect range shown in FIG. 2A. In the example shown in FIG. 2A, regions d1 to d3 estimated as the defect range in the substrate W are specified from an imaging result of the substrate W. As illustrated in FIG. 2B, by acquiring gray values for each of the regions d1 to d3, a defect in the region d1 is found to be one caused by a developer; a defect in the region d2, one caused by yttrium; and a defect in the region d3, one caused by the resist. By determining the defect type in this way, it becomes possible to estimate a cause (factor) of the defect (a process and an apparatus/module in which the defect has occurred) (details of this will be described later).

Referring back to FIG. 1, the analyzing device 10 has an imaging unit 11, a gray value detection unit 12, and an analysis unit 13. The imaging unit 11 and the analysis unit 13 are configured to communicate with each other. Further, the gray value detection unit 12 and the analysis unit 13 are configured to communicate with each other. In addition, the configuration of the analyzing device 10 shown in FIG. 1 is just an example, and the layout of the components belonging to the analyzing device 10 is not limited to the example shown in FIG. 1. That is, functional units constituting the analysis unit 13 and the imaging unit 11 may be individually mounted to other apparatuses, and necessary information may be exchanged between the individual functional units. The functional units constituting the analysis unit 13 herein include a defect range estimation unit 131, a gray value acquisition unit 132, a defect type determination unit 133, and a factor estimation unit 134. For example, the imaging unit 11 and the defect range estimation unit 131 may be mounted on another apparatus such as the coating apparatus 20. Further, the defect type determination unit 133 and the factor estimation unit 134 of the analysis unit 13 may be mounted on another server (not shown). Additionally, the analyzing device 10 itself may be mounted on another apparatus such as, but not limited to, the coating apparatus 20.

The imaging unit 11 performs imaging of the surface of the substrate W under the control of the analysis unit 13, and transmits an imaging result to the analysis unit 13. Based on this imaging result, the defect range of the substrate W is estimated by the analysis unit 13 (details of this will be described later).

Figure 3:
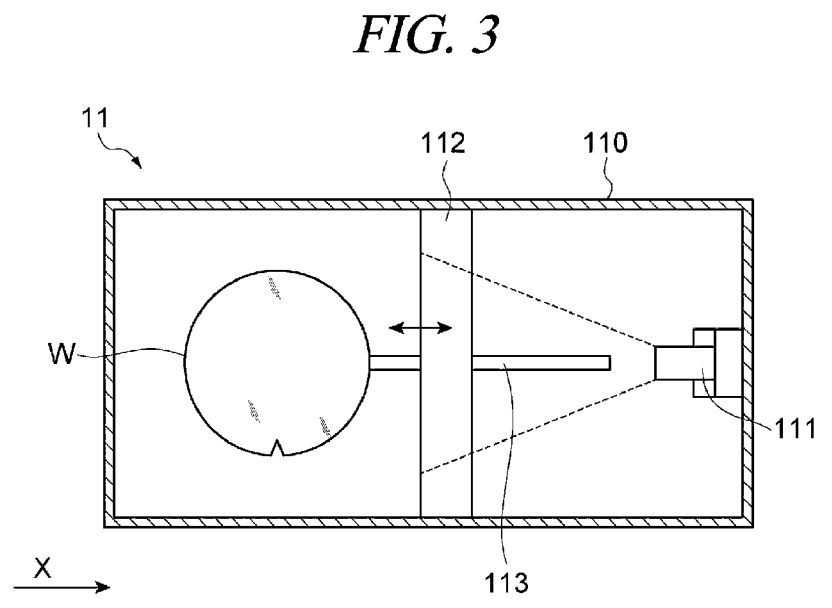
Figure 4:
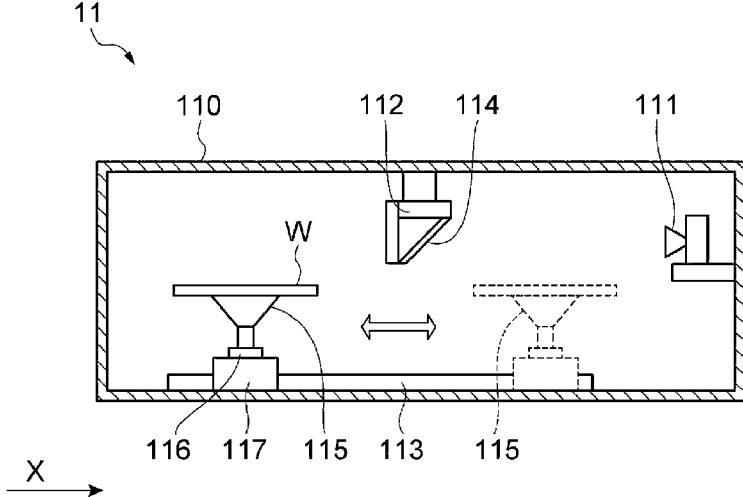
FIG. 4 is a longitudinal cross sectional view schematically illustrating the configuration of the imaging unit.

FIG. 3 is a transversal cross sectional view schematically illustrating a configuration of the imaging unit 11. FIG. 4 is a longitudinal cross sectional view schematically illustrating the configuration of the imaging unit 11. The imaging unit 11 has a casing 110, as shown in FIG. 3 and FIG. 4. A placing table 115 for mounting the substrate W thereon is provided in the casing 110. This placing table 115 is configured to be freely rotated and stopped by a rotational driving unit 116 such as a motor. A guide rail 113 extending from one end side (negative-X direction side in FIG. 4) to the other end side (positive X-direction side in FIG. 4) of the casing 110 is provided on a bottom surface of the casing 110. The placing table 115 and the rotational driving unit 116 are disposed on the guide rail 113 and configured to be movable along the guide rail 113 by a driving device 117.

Within the casing 110, a camera 111 is provided on a side surface on the other end side (positive X-direction side in FIG. 4) of the casing 110. The camera 111 may be, by way of non-limiting example, a line sensor camera. A half mirror 114 is provided near an upper central portion of the casing 110. The half mirror 114 is provided at a position facing the camera 111 with a mirror surface thereof inclined upwards by 45 degrees toward the direction of the camera 111 from a state where the mirror surface faces vertically downwards. A light source 112 is provided above the half mirror 114. The half mirror 114 and the light source 112 are fixed to a top surface of the casing 110. Light from the light source 112 passes through the half mirror 114 to be illuminated downwards. Then, the light reflected by an object (here, the substrate W) located below the light source 112 reaches the camera 111 after being further reflected by the half mirror 114. In this way, the camera 111 is capable of imaging the surface of the substrate W. That is, in the imaging unit 11, by moving the substrate W along the guide rail 113 in one direction (X direction in FIG. 4), the surface of the substrate W is imaged by the camera 111 so as to be scanned.

The gray value detection unit 12 is configured to detect a gray value, when light is radiated, for the defect range (details of this will be described later) estimated by the analysis unit 13 based on the imaging result of the imaging unit 11. The gray value detection unit 12 includes a SWIR (Short Wavelength Infra-Red) sensor 121 configured to detect shortwave infrared light. The shortwave infrared light is, for example, light in a wavelength band of 700 nm to 2500 nm, and may be light in a wavelength band of 900 nm to 1700 nm. The SWIR sensor 121 is capable of detecting gray values of, for example, various kinds of chemical liquids (organic and inorganic chemical liquids) and a metal while distinguishing them. The gray value detection unit 12 performs the gray value detection under the control of the analysis unit 13, and transmits a detection result to the analysis unit 13. Based on the detection result, the analysis unit 13 determines the defect type in the defect range of the substrate W (details of this will be described later).

Figure 5:
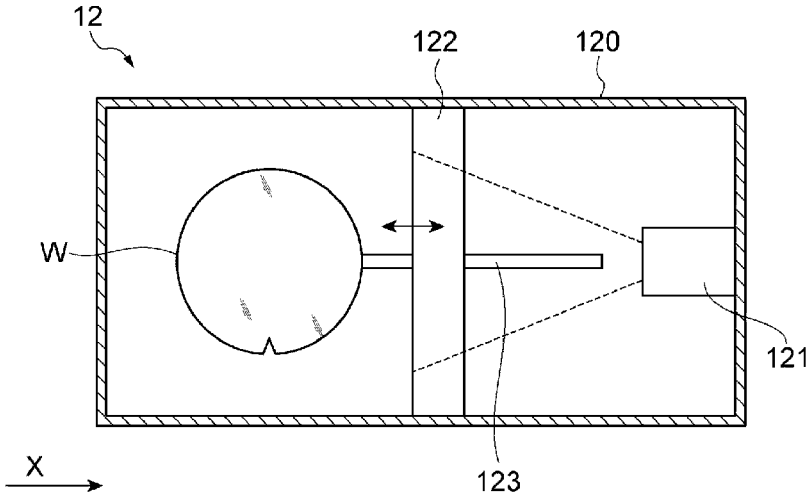
FIG. 5 is a transversal cross sectional view schematically illustrating a configuration of a gray value detection unit.
Figure 6:
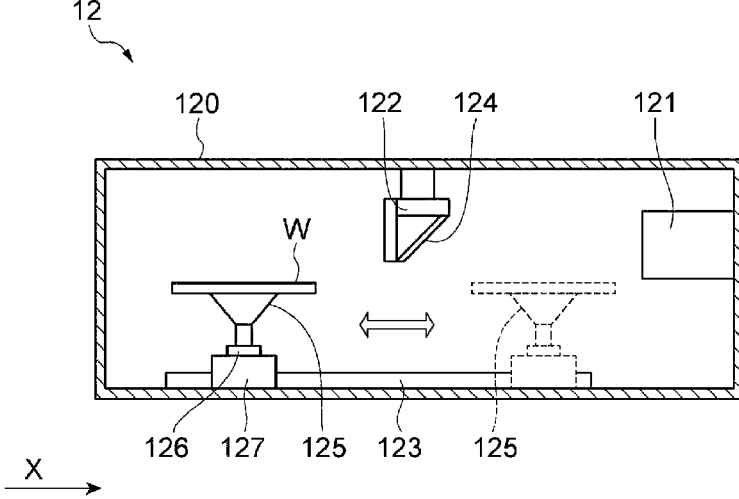
FIG. 6 is a longitudinal cross sectional view schematically illustrating the configuration of the gray value detection unit.

FIG. 5 is a transversal cross sectional view schematically illustrating a configuration of the gray value detection unit 12. FIG. 6 is a longitudinal cross sectional view schematically illustrating the configuration of the gray value detection unit 12. The gray value detection unit 12 has, as depicted in FIG. 5 and FIG. 6, a casing 120. A placing table 125 for mounting the substrate W thereon is provided in the casing 120. This placing table 125 is configured to be freely rotated and stopped by a rotational driving unit 126 such as a motor. A guide rail 123 extending from one end side (negative X-direction side in FIG. 6) of the casing 120 to the other end side (positive X-direction direction side in FIG. 6) is provided on a bottom surface of the casing 120. The placing table 125 and the rotational driving unit 126 are disposed on the guide rail 123 and configured to be movable along the guide rail 123 by a driving device 127.

Within the casing 120, the SWIR sensor 121 is provided on a side surface on the other end side (positive X-direction side in FIG. 6) of the casing 120. The SWIR sensor 121 may be a SWIR camera. A half mirror 124 is provided near an upper central portion of the casing 120. The half mirror 124 is provided at a position facing the SWIR sensor 121 with its mirror surface inclined upwards by 45 degrees toward the direction of the SWIR sensor 121 from a state in which the mirror surface faces vertically downwards. A light source 122 is provided above the half mirror 124. The light source 122 is one configured to radiate light including a wavelength range of short-wave infrared light at least. For example, the light source 122 may be a white light source. The light source 122 radiates light of multiple wavelength bands. For example, the light source 122 radiates light in wavelength bands of 1000 nm, 1200 nm, and 1400 nm at least. The half mirror 124 and the light source 122 are fixed to a top surface of the casing 120. The light from the light source 122 passes through the half mirror 124 and is illuminated downwards. The light from the light source 122 is radiated to the entire surface of the substrate W, for example. The light reflected on the surface of the substrate W is detected by the SWIR sensor 121 after being further reflected by the half mirror 124. In this way, the SWIR sensor 121 is capable of detecting the light from the entire surface of the substrate W, and capable of detecting gray values (a gray value distribution) for the plurality of wavelengths in individual regions on the surface of the substrate W. Here, the SWIR sensor 121 may detect only the gray values of the defect range of the substrate W. Specifically, by adjusting the position and the direction of the substrate W through the use of the driving device 127 and the rotational driving unit 126, the SWIR sensor 121 may be made to detect only the gray values of the defect range of the substrate W.

Moreover, in the above description, the imaging unit 11 and the gray value detection unit 12 are configured as separate components. However, if the defect range can be specified and the gray value can be acquired through the imaging by a single imaging unit, the only one imaging unit may be provided.

Referring back to FIG. 1, the analysis unit 13 includes the defect range estimation unit 131, the gray value acquisition unit 132, the defect type determination unit 133, the factor estimation unit 134, and a storage 135.

Based on the imaging result (captured image) of the imaging unit 11, the defect range estimation unit 131 estimates the defect range that is a range in which a defect exists on the surface of the substrate W. The defect range estimation unit 131 estimates the defect range on the surface of the substrate W from pixel values of the individual regions on the surface of the substrate W shown in the captured image.

The gray value acquisition unit 132 acquires the gray value in the defect range when the light is radiated to the surface of the substrate W. Specifically, the gray value acquisition unit 132 may acquire gray values of the individual regions on the surface of the substrate W from the gray value detection unit 12 and may specify (acquire) the gray value of the defect range from those gray values. The gray value acquisition unit 132 may acquire a gray value corresponding to each of a plurality of wavelength bands in the defect range. The plurality of wavelength bands herein are, by way of example, three or more wavelength bands of, e.g., 1000 nm, 1200 nm, and 1400 nm.

The defect type determination unit 133 determines the defect type in the defect range based on the gray value. When a plurality of regions in which distributions of gray values differ from each other exist in the single defect range, the defect type determination unit 133 may determine the defect type for each of the plurality of regions. That is, the defect type determination unit 133 may not only determine one defect type for one defect range, but, when the plurality of regions in which the distributions of the gray values are different from each other exist in one defect range, it may also determine the defect type of each region.

The defect type determination unit 133 may determine the defect type based on the gray value corresponding to each of the plurality of wavelengths. The defect type determination unit 133 may determine the defect type based on a tendency of change between the gray values respectively corresponding to the plurality of wavelengths. The determination of the defect type will be further elaborated with reference to FIG. 7 and FIG. 8A and FIG. 8B.

Figure 7:
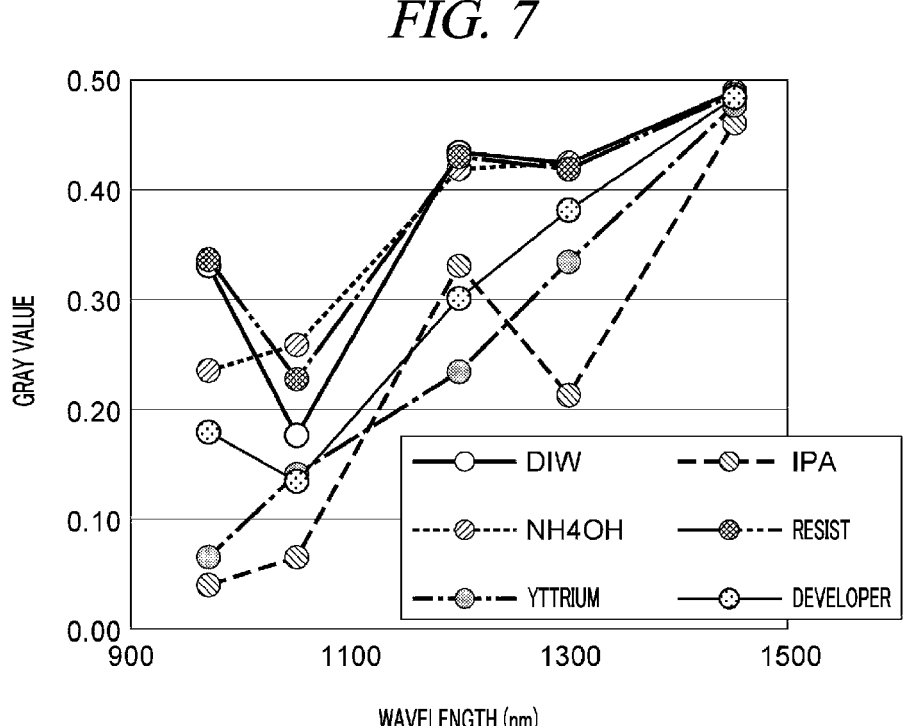
FIG. 7 is a diagram showing a relationship between a gray value and a wavelength for each type of defect.

FIG. 7 is a diagram showing a relationship between a gray value and a wavelength for each type of defect. In FIG. 7, a horizontal axis indicates a wavelength, and a vertical axis indicates a gray value. FIG. 7 shows gray values detected for multiple wavelengths of the radiated light for each of chemicals (the resist, the developer, etc.) that may become a defect when they are present on the surface of the substrate. As shown in FIG. 7, since the distribution of the gray values at the individual wavelengths is different between defect types (chemicals that can become a defect when they are present on the surface of the substrate), it is possible to determine a defect type from the gray values.

Here, as shown in FIG. 7, the defect type may not sometimes be identified from the gray value at only one wavelength. For this reason, it is desirable to determine the defect type based on the gray values respectively corresponding to the plurality of wavelengths.

Figures 8A, 8B:
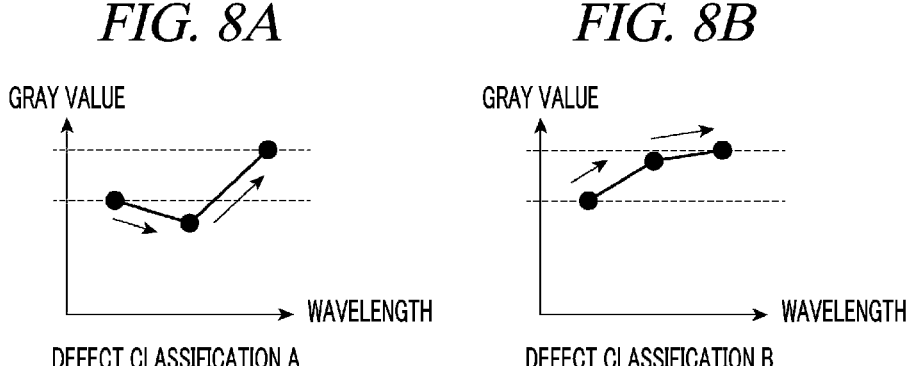
FIG. 8A and FIG. 8B are diagrams each showing an example of a tendency of change in gray value between multiple wavelengths.

Moreover, even when the gray values respectively corresponding to the plurality of wavelengths are taken into consideration, the defect type may not be identified as the gray value distributions are similar. In this case as well, by considering the tendency of change between the gray values respectively corresponding to the plurality of wavelengths, the defect type can still be determined. FIG. 8A and FIG. 8B are diagrams each showing an example of the tendency of change in gray values between the wavelengths. In a defect classification A shown in FIG. 8A, the gray value decreases from a gray value on the shortest wavelength side toward a gray value in an adjacent wavelength band, and then increases toward a gray value on the longest wavelength side. Meanwhile, in a defect classification B shown in FIG. 8B, the gray value increases from a gray value on the shortest wavelength side toward a gray value in an adjacent wavelength band, and then further increases toward a gray value on the longest wavelength side. In this way, since the tendency of change in the gray values respectively corresponding to the plurality of wavelengths is different between the defect classification A and the defect classification B, the defect type can be specified by considering this tendency of change. Here, the tendency of change is, for example, upward or downward fluctuations of the gray value, a degree of the upward or downward fluctuations, etc. As described above, when there are three or more wavelengths, the number of adjacent sections between the wavelengths become two or more, so that the tendency of change can be more suitably specified.

The defect type determination unit 133 may collect data of the gray value for each wavelength by using, as a teaching data, data of an external analyzer indicating the relationship between the gray value and the wavelength for each defect type as shown in FIG. 7, for example. In addition, the defect type determination unit 133 may generate a model (a regression model, a machine learning model, etc.) for determining the defect type from the data of the gray values of the multiple wavelengths. In this case, the data of the gray value for each wavelength may be acquired by, for example, a formula of gray value×wavelength 1000 nm+gray value× wavelength 1200 nm+gray value×wavelength 1400 nm. The defect type determination unit 133 stores the data of the gray value for each wavelength and the model generated from each data in the storage 135. The defect type determination unit 133 determines the defect type from the data of the gray values of the multiple wavelengths based on the model stored in the storage 135.

Referring back to FIG. 1, the factor estimation unit 134 estimates a defect-causing factor in the previous process based on the defect type determined by the defect type determination unit 133. Here, the previous process is a process performed before the processing state of the substrate is analyzed by the analyzing device 10, for example. By way of example, the previous process is a process performed by the coating apparatus 20, the developing apparatus 30, the exposure apparatus 40, the etching apparatus 50 or the cleaning apparatus 60. Estimating the defect-causing factor means estimating a process (specific processing) in which the defect has occurred, or estimating an apparatus/module performing that process.

The factor estimation unit 134 may estimate the defect-causing factor based on the defect type determined by the defect type determination unit 133, defect specifications such as the shape of the defect and the location of the defect, and information upon the apparatus of the previous process (including customer host information, etc.). For example, it is assumed that the defect type is found by the defect type determination unit 133 to be an IPA defect. In this case, assume that the defect has a shape in which it exists in a local area in a radial direction of the substrate, such as a shape in which the defect on the substrate draws a line in a circumferential direction or forms an arc. In this case, the factor estimation unit 134 may assume that a liquid left in a rotation process is the defect-causing factor, that is, may assume that the cleaning processing accompanying rotation is the process (specific processing) in which the defect has occurred. Further, assume that the shape of the defect has directionality from one end side of the substrate toward the opposite side thereof, for example. In this case, the factor estimation unit 134 may assume that the drying processing of supplying the IPA after the phosphoric acid batch processing is the process (specific processing) in which the defect has occurred.

Figure 9:
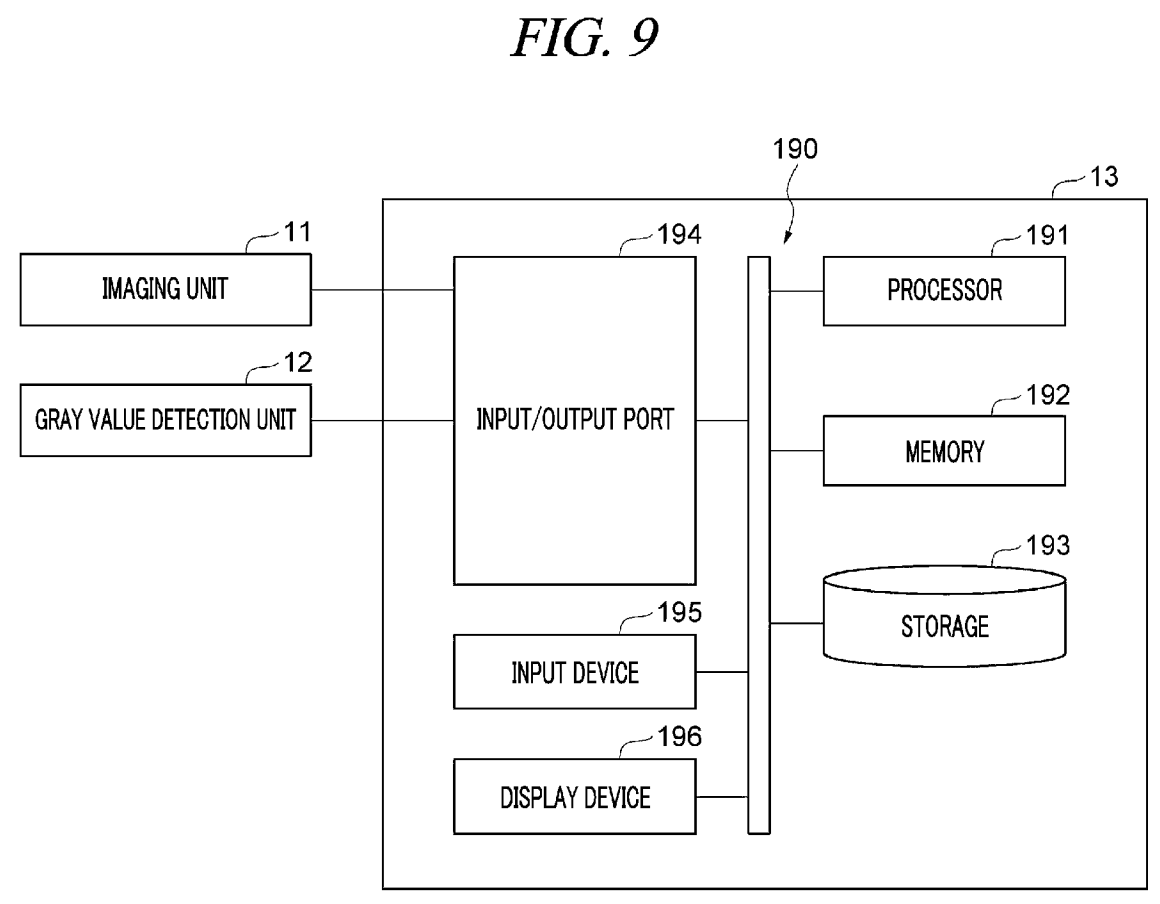

FIG. 9 is a block diagram illustrating a hardware configuration of the analysis unit 13. The analysis unit 13 is implemented by one or more control computers. As shown in FIG. 9, the analysis unit 13 has a circuit 190. The circuit 190 includes at least one processor 191, a memory 192, a storage 193, an input/output port 194, an input device 195, and a display device 196.

The storage 193 includes, for example, a computer-readable recording medium such as a hard disk. The storage 193 stores therein a program for causing the analysis unit 13 to perform an information processing method of the analysis device 10. For example, the storage 193 stores therein a program for configuring each of the above-described functional blocks in the analysis unit 13.

The memory 192 temporarily stores therein the program loaded from the recording medium of the storage 193 and an operation result by the processor 191. The processor 191 executes the program in cooperation with the memory 192, thus configuring each of the above-described functional modules. The input/output port 194 performs an input/output of electric signals between the imaging unit 11 and the gray value detection unit 12 in response to an instruction from the processor 191.

The input device 195 and the display device 196 function as a user interface of the analysis unit 13. The input device 195 is, for example, a keyboard, and acquires input information from a user. The display device 196 includes, for example, a liquid crystal monitor, and is used to display information for the user. By way of example, the display device 196 is used to display the aforementioned factor information. The input device 195 and the display device 196 may be integrated as a so-called touch panel.

Now, referring to FIG. 10, a processing sequence of a substrate analysis method performed by the analyzing device 10 will be explained. FIG. 10 is a flowchart illustrating the processing sequence of the substrate analysis method.

As shown in FIG. 10, a substrate surface is first imaged (process S1, imaging process). Then, based on an imaging result in the imaging process, a defect range in which a defect exists on the substrate surface is estimated (process S2, defect range estimation process).

Subsequently, a gray value in the defect range when light is radiated to the substrate surface is acquired (process S3, a gray value acquisition process). Then, based on the gray value, the type of the defect in the defect range is determined (process S4, defect type determination process).

Finally, based on the defect type determined in the defect type determination process, a defect-causing factor in a previous process is estimated (process S5, factor estimation process).

Now, functions and effects of the analyzing device 10 according to the present exemplary embodiment will be discussed.

The analyzing device 10 is equipped with the imaging unit 11 configured to image the substrate surface; and the defect range estimation unit 131 configured to estimate the defect range, which is a range in which the defect exists on the substrate surface, based on the imaging result of the imaging unit 11. Further, the analyzing device 10 is equipped with the gray value acquisition unit 132 configured to acquire multiple gray values in the defect range when the light is radiated to the substrate surface; and the defect type determination unit 133 configured to determine the defect type in the defect range based on the gray value.

In the analyzing device 10 according to the present exemplary embodiment, the defect range on the substrate surface is first estimated based on the imaging result of the substrate surface, and, then, the defect type in the defect range is determined based on the gray values in the defect range when the light is radiated to the substrate surface. Since there is a correlation between the gray values and the defect type, the defect type can be determined with high precision based on the gray values, and the processing state for the substrate processing can be analyzed appropriately. An approximate defect range is estimated from the imaging result, and the defect type is then determined from the gray values in the imaging range. Thus, the determination of the defect type can be efficiently performed while limiting a range in which the determination of the defect type based on the gray values is performed. In addition, as compared to an inspecting device that performs extraction inspection of a substrate during a substrate processing and requires a processing time for every single sheet of substrate, as in the prior art, it is possible to perform the determination of the defect type efficiently. As stated above, with the analyzing device 10 according to the present exemplary embodiment, the processing state for the substrate processing can be efficiently analyzed.

The gray value acquisition unit 132 may acquire gray values respectively corresponding to multiple wavelengths of the light in the defect range, and the defect type determination unit 133 may determine the defect type based on the gray values respectively corresponding to the multiple wavelengths. Since the gray values are different at the individual wavelengths, the defect type can be determined from the gray values respectively corresponding to the multiple wavelengths. Therefore, the defect type can be determined more accurately.

When multiple regions in which distributions of the gray values are different from each other exist in the single defect range, the defect type determination unit 133 may determine the defect type for each of the multiple regions. Accordingly, even in case that the multiple regions having different gray values distributions (that is, different types of defects) exist in a certain defect range estimated from the imaging result, it is possible to properly determine the defect type in each region.

The defect type determination unit 133 may determine the defect type based on a change tendency between the gray values respectively corresponding to the multiple wavelengths. As described above, instead of simply determining the defect type based on absolute values of the gray values, the change tendency between the gray values is considered. Accordingly, the defect type can be determined more accurately. Further, even when the absolute values fluctuate due to an influence of a noise, for example, the defect type can still be determined accurately if the change tendency between the gray values is taken into account.

The analyzing device 10 may be further equipped with the factor estimation unit 134 configured to estimate a defect-causing factor in the previous process based on the defect type determined by the defect type determination unit 133. With this configuration, the defect-causing factor (such as a process and an apparatus/module in which the defect has occurred) can be specified, and the generation of the defect can be suppressed by ameliorating the defect-causing factor.

According to the exemplary embodiment, it is possible to provide the substrate analyzing system, the substrate analyzing method, and a recording medium capable of analyzing a processing state for a substrate processing.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting. The scope of the inventive concept is defined by the following claims and their equivalents rather than by the detailed description of the exemplary embodiments. It shall be understood that all modifications and embodiments conceived from the meaning and scope of the claims and their equivalents are included in the scope of the inventive concept.

I claim:

1. A substrate analysis system, comprising:
an imaging unit configured to image a substrate surface;
a defect region estimation unit configured to estimate a defect region, where a defect exists on the substrate surface, based on an imaging result of the imaging unit;
a gray value acquisition unit configured to, after the defect region is estimated by the defect region estimation unit, acquire multiple gray values within the defect region when light is radiated to the substrate surface; and
a defect type determination unit configured to identify a type of the defect within the defect region based on the acquired gray values.

2. The substrate analysis system of claim 1,
wherein the gray value acquisition unit acquires the multiple gray values respectively corresponding to multiple wavelengths of the light in the defect region, and
the defect type determination unit determines the defect type based on the gray values respectively corresponding to the multiple wavelengths.

3. The substrate analysis system of claim 2,
wherein the defect type determination unit determines the defect type based on a change tendency between the multiple gray values respectively corresponding to the multiple wavelengths.

4. The substrate analysis system of claim 1,
wherein when multiple regions in which distributions of the multiple gray values are different from each other exist in the single defect region, the defect type determination unit determines the defect type for each of the multiple regions.

5. The substrate analysis system of claim 1, further comprising:
a factor estimation unit configured to estimate a defect-causing factor in a previous process based on the defect type determined by the defect type determination unit.

6. A substrate analysis method, comprising:
imaging a substrate surface;
estimating a defect region, where a defect exists on the substrate surface, based on an imaging result in the imaging of the substrate surface;
after the defect region is estimated, acquiring multiple gray values within the defect region when light is radiated to the substrate surface; and
identifying a type of the defect within the defect region based on the acquired multiple gray values.

7. The substrate analysis method of claim 6,
wherein the multiple gray values respectively corresponding to multiple wavelengths of the light in the defect region are acquired in the acquiring of the multiple gray values, and
the defect type is determined based on the multiple gray values respectively corresponding to the multiple wavelengths in the determining of the defect type.

8. The substrate analysis method of claim 7,
wherein the defect type is determined based on a change tendency between the multiple gray values respectively corresponding to the multiple wavelengths in the determining of the defect type.

9. The substrate analysis method of claim 6,
wherein when multiple regions in which distributions of the multiple gray values are different from each other exist in the single defect region, the defect type is determined for each of the multiple regions in the determining of the defect type.

10. The substrate analysis method of claim 6, further comprising:

estimating a defect-causing factor in a previous process based on the defect type determined in the determining of the defect type.

11. A computer-readable recording medium having stored thereon computer-executable instructions that, in response to execution, cause an apparatus to perform a substrate analysis method as claimed in claim 6.

\* \* \* \* \*